July 25, 1933.  A. KATES  1,919,731

SPECTACLES

Filed Feb. 6, 1931

INVENTOR

Abraham Kates

BY
Busser and Harding
ATTORNEYS.

WITNESS:

Patented July 25, 1933

1,919,731

UNITED STATES PATENT OFFICE

ABRAHAM KATES, OF PHILADELPHIA, PENNSYLVANIA

SPECTACLES

Application filed February 6, 1931. Serial No. 513,909.

In the manufacture of spectacles the two ear pieces are not interchangeable; one ear piece having an end adapted to be pivotally attached to the right eye lens and the other having an end adapted to be pivotally attached to the left eye lens. Hence it is necessary to manufacture the ear pieces in pairs. So, also, retail dealers, most of whom do repair work, must lay in a supply of pairs of ear pieces. It would be highly desirable if both ear pieces could be constructed alike, thereby necessitating the manufacture, and the keeping in stock, of multiple units, instead of multiple pairs, of ear pieces.

This desideratum is substantially attained by means of the invention forming the subject-matter of this application, wherein each ear piece (hereinafter called the ear-engaging lever) is made in two parts, detachable one from another, one part (hereinafter called the temple rod) being reversible so as to be adapted to be pivotally attached to either eye glass, or eye glass frame, and, in either what may be called, for convenience, is normal or reversed position, being so attachable to the other part (hereinafter called the ear piece) that the latter will occupy its proper downwardly curved position relative to the eye glasses.

The invention will be understood by reference to the following description, in connection with the appended drawing, of a preferred embodiment of the invention.

The eye glass proper comprises, as usual, two glasses $a$, $a$ (with or without marginal frames) connected by a nose bridge $b$, each glass being provided with an ear $c$ to which is pivoted the temple rod $g$. The pivotal end of the temple rod may be constructed in the way in which the pivotal end of the usual ear-engaging lever is constructed; that is, it is provided, at the pivoted end, with a flat head $d$ having an orifice adapted to pivot on a pin $e$ on ear $c$; the head $d$ having an eccentric projection $f$ adapted, when the rod $g$ is swung outward slightly beyond the perpendicular relative to the eye glass, to abut against the ear $c$, thereby limiting the extent of the swinging movement of the temple rod.

It is obvious that, in an ordinary ear-engaging lever, the projection $f$ must be positioned on the outside; and since its ear-engaging end must curve downward, the two ear-engaging levers cannot be interchanged.

In the construction embodying my invention, however, the ear piece and the temple rod $g$ are separate one from another. It is obvious that the temple rod $g$, shown in Fig. 2 as adapted to be pivotally engaged with one of the two eye glasses, may be turned on its axis 180° and be thus adapted to be pivotally engaged with the other eye glass. The temple rod $g$ and ear piece are so constructed that, with the ear piece properly positioned relative to the eye glasses, the two parts may be mechanically united in either position of the temple rod $g$.

To permit such union, the temple rod $g$ is provided, at the end opposite its pivotal end, with a (preferably) flat section, adapted to telescopically engage a tubular end $k$ (of similar cross section) of the ear piece. The rod $g$ is provided with one or more (preferably semi-circular) recesses $h$ adapted to be aligned with holes $i$ in opposite walls of the tubular end $k$. By means of a screw or rivet $j$ or other suitable pin extending through holes $i$ and engaging recesses $h$, the two members are secured together.

The ear-engaging end of the ear piece may comprise a flexible wire $m$ upon which is spirally wound a thin flexible steel tape $n$, this construction being an ordinary one. The end of wire $m$ telescopically engages, and is permanently secured, as by welding, to the tubular member $k$. This is an important improvement over the present method of welding the parts $m$ and $n$, as a unit, to the shank of the temple rod.

Figure 1:
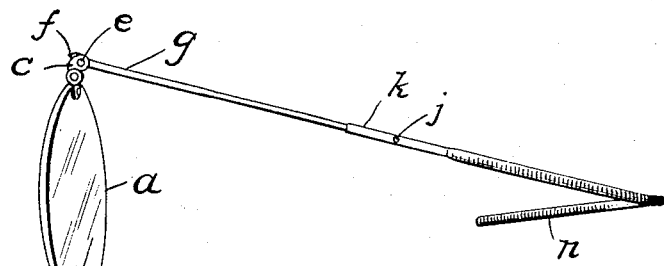
Fig. 1 is a perspective view of a pair of spectacles embodying my invention.
Figure 2:
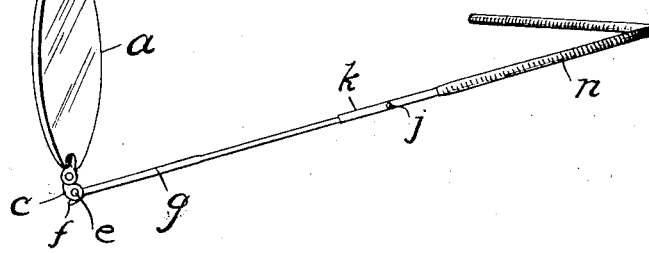
Fig. 2 is a plan view of the two members, detached, of the ear-engaging lever.
Figure 2:
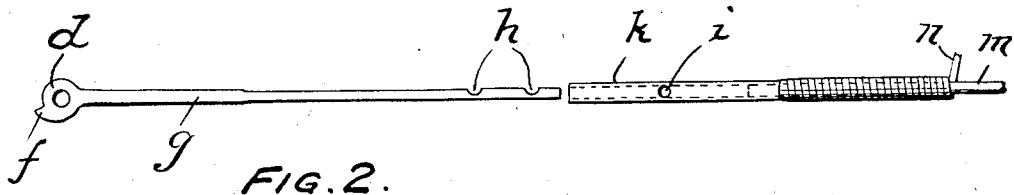
Figure 3:
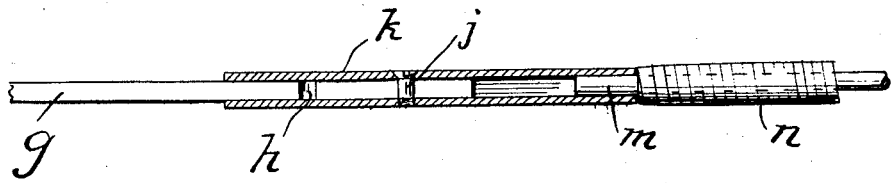
Fig. 3 is an enlarged view of the same parts, taken at right angles to Fig. 2, and mainly in longitudinal section.

It is obvious that members $g$ and $k$ may be secured together whether member $k$ occupies the position shown in Fig. 2 or the reverse position described.

In the preferred construction, member $g$ is provided with a plurality of recesses $h$ so that the ear-engaging lever may have any one of several different lengths, thereby still further reducing the number of parts required to be carried in stock.

The means shown for securing together the parts $g$ and $h$ is preferred, although I do not wish to be limited thereto. It is possible to have so tight a sliding fit between these members that no mechanical securing devices would be required; or the two members may be welded together, or otherwise secured, either permanently or detachably, although the detachable connection is preferred, since it enables the parts to be reused.

Having now fully described my invention, what I claim and desire to protect by Letters Patent is:

1. An improved ear-engaging lever for spectacles comprising an ear piece and a temple rod adapted to be pivotally mounted on either of the spectacle glasses, said ear piece comprising one end portion adapted to engage the ear and another tubular end portion of non-circular inner cross section, said temple rod having, opposite its pivotal end, a solid end of a non-circular cross-section similar to that of the tube and adapted to be slipped thereinto, said tube having aligning holes in its opposite walls, the solid end of the temple rod having a recess adapted, when slipped into the tube, to be aligned with said holes, and a pin adapted to engage the aligning recess and holes.

2. An improved ear-engaging lever for spectacles having two parts, one of which consists of an ear piece having an ear-engaging portion and the other of which consists of a temple rod adapted to be pivotally mounted on either of the spectacle glasses, one part having a tubular end portion of non-circular inner cross-section, and the other having a solid end of a non-circular cross-section similar to that of the tube end adapted to be slipped thereinto, said tube having aligning holes in its opposite walls, the solid end of the other part having a recess adapted, when slipped into the tube, to be aligned with said holes, and a pin adapted to engage the aligning recess and holes.

3. An improved ear-engaging lever for spectacles having two parts, one of which consists of an ear piece having an ear-engaging portion and the other of which consists of a temple rod adapted to be pivotally mounted on either of the spectacle glasses, one part having a tubular end portion of non-circular inner cross-section, and the other having a solid end of a non-circular cross-section similar to that of the tube and adapted to be slipped thereinto, said tube having a hole in the wall thereof, the solid end of the other part having a recess adapted, when slipped into the tube, to be aligned with said hole, and a pin adapted to engage the aligning recess and hole.

ABRAHAM KATES.